US005868326A

United States Patent [19]
Speegle

[11] Patent Number: 5,868,326
[45] Date of Patent: Feb. 9, 1999

[54] POWDER DISPENSING APPARATUS

[76] Inventor: Billie G. Speegle, 541 E. Cameron Bridge Rd., Bozeman, Mont. 59718

[21] Appl. No.: 900,963

[22] Filed: Aug. 12, 1997

[51] Int. Cl.[6] .................... A01C 3/06; B05B 1/28

[52] U.S. Cl. .................... 239/654; 239/142; 239/143; 239/290

[58] Field of Search .................... 239/142, 143, 239/290, 654

[56] References Cited

U.S. PATENT DOCUMENTS

| | | | |
|---|---|---|---|
| 3,478,969 | 11/1969 | Lund | 239/654 |
| 4,319,717 | 3/1982 | Hofmann | 239/654 |
| 5,213,271 | 5/1993 | Uribe et al. | 239/654 |
| 5,615,830 | 4/1997 | Matsunaga et al. | 239/8 |
| 5,725,160 | 3/1998 | Harper et al. | 239/654 |

*Primary Examiner*—Andres Kashnikow
*Assistant Examiner*—Robin O. Evans

[57] ABSTRACT

Disclosed is a new and improved apparatus primarily developed for use in dispensing powder to a media surface comprising a mounting means, a hopper tube, a porous hopper feed roller, a vortex chamber, a plurality of two primary air manifolds, and a plurality of two air bars. The hopper tube contains the porous hopper feed roller in rotatable manner. The porous hopper feed roller controls the quantity of powdered particulate material being discharged into the vortex chamber. A variable speed motor is provided and provides for ½ to 25 RPM rotational speed of the porous hopper feed roller. The vortex chamber receives the desired quantity of powdered particulate material from the hopper tube. The vortex chamber has an air pressure receipt means creating a vortex of rotating air within the vortex chamber. The vortex of rotating air within the vortex chamber receives the powdered particulate material from the hopper tube. The vortex chamber has an air pressure discharge means. A plurality of two primary air manifolds are provided receiving a measured amount of air pressure from an outside air pressure source. A plurality of two longitudinal air bars are provided.

26 Claims, 6 Drawing Sheets

POWDER DISPENSING APPARATUS

BACKGROUND OF THE INVENTION

1. Field of the Invention

The present invention relates to powder coating, and more particularly, to an apparatus for use in dispensing powder to a media surface.

2. Description of the Prior Art

Apparatuses for dispensing powder to a media surface are known in the prior art. More specifically, powder dispensing apparatuses heretofore devised and utilized are known to consist basically of familiar, expected and obvious structural configurations, notwithstanding the myriad of designs encompassed by the prior art which have been developed for the fulfillment of countless objectives and requirements.

The present invention is directed to an improved apparatus for dispensing powder to a media surface.

U.S. Pat. No. 5,615,830 to Matsunaga et al., describes an apparatus and method for supply and transport of powder particles. More specifically, Matsunaga et al. teaches a powder particle supply and transport apparatus and method including a hopper filled with powder particles, an ejection chamber spaced from the hopper and a movable conveying member with a plurality of cavities formed therein. The conveying member moves the cavities between the hopper and the chamber, and the cavities are filled with powder particles at the hopper and emptied of powder particles at the chamber. An ejector nozzle sprays pressurized air into the chamber toward an aligned outlet creating negative pressure in the chamber to draw powder particles from the cavities as the cavities are moved therethrough, and to transport powder particles through the outlet to a spray gun.

U.S. Pat. No. 4,867,063 to Baker et al. describes a method and apparatus for dispensing powder in a printing press. More specifically, Baker et al. teaches a powder delivery system for use in dispensing powder to a printing press, including an agitator system for the powder reservoir, a wiper block for use with a curved feed roller, a split air flow amplifier which is openable for cleaning, a flow-through rotary manifold for distributing powder to press and a powder spray block.

U.S. Pat. No. 4,824,695 to Coulon et al. describes a process and apparatus for coating a substrate. More specifically, Coulon et al. teaches a process and apparatus for coating a substrate, particularly a glass ribbon, with a pulverulent product, by the implementation of a distribution nozzle that sprays the pulverulent product in suspension in a gas, and a suction device for evacuating the resultant waste of the decomposition of the pulverulent product from a coating zone.

U.S. Pat. No. 4,332,198 to Schmoeger describes a printing press with an air assist sheet delivery and powdering system. More specifically, Schmoeger teaches a standard offset printing press having the delivery end thereof modified with an air nozzle that is disposed above an underlying sheet travel path and which is designed to direct a continuous stream of pressurized air against the paper's top surface as it emerges from the printing press and is directed into a stacking area about the delivery end.

U.S. Pat. No. 4,209,533 to Greenberg describes a method and apparatus for making material with a fusible backing. More specifically, Greenberg teaches making a material with a fusible backing by bringing a substrate into contact with the outside of a rotatable printing screen having fine fusible polymer dust supplied to its inner side and then bringing the substrate out of contact with the screen and heating it from below to fuse the polymer to the substrate. The amount of dust falling out of the screen onto the substrate after the substrate leaves the screen is controlled by suctioning off a portion of the falling dust.

U.S. Pat. No. 3,478,969 to Lund describes a pneumatic precipitating powder applying apparatus. More specifically, Lund teaches an anti-offset powder dispensing apparatus for distributing powder on an object to be protected comprising an elongated powder container having opposed blade members defining a powder dispensing opening, a cylindrical feed roller having a roughened metallic surface and positioned parallel and adjacent to said container as said opening and which is adapted to hold powder, means for driving said roller through said container opening whereby powder is removed onto said roughened surface and a plurality of jet means positioned closely adjacent to and extending along said roller to transfer the powder from said surface to the object to be protected.

U.S. Pat. No. 3,333,570 to Paasche describes an anti-ink offset powder assembly. More specifically, Paasche teaches an apparatus for spraying a finely atomized powder on freshly printed sheets to prevent ink offset from one freshly printed surface to the next superimposed surface.

U.S. Pat. No. 2,817,310 to Ponzini describes air-actuated devices for producing and dispensing comminuted solids in suspension. More specifically, Ponzini teaches compressed-air-actuated devices for spraying powder in suspension.

U.S. Pat. No. 2,093,995 to Blow describes a method of preventing offsetting of freshly printed surfaces. More specifically, Blow teaches one or more gun or discharge nozzles so mounted and disposed as to discharge the protecting agent from an air-pressurized container over the surface of the uppermost sheet in a stack.

The powder dispensing apparatus according to the present invention substantially departs from the conventional concepts and designs of the prior art, and in doing so, provides for an apparatus for use in dispensing powder to a media surface which is economical and easily used.

Therefore, it can be appreciated that there exists a continuing need for a new apparatus primarily developed for use in dispensing powder to a media surface which is economical and easily used. In this regard, the present invention substantially fulfills this need.

As illustrated by the background art, efforts are continuously being made in an attempt to develop new apparatuses for use in dispensing powder to a media surface. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

SUMMARY OF THE INVENTION

In view of the foregoing disadvantages inherent in the prior art, the present invention provides a new and improved apparatus for use in dispensing powder to a media surface which is economical and easily used. The new apparatus for dispensing powder to a media surface of the present invention will apply a more even and controlled coating of powder to the media surface by suspending the powder in an air vortex and then applying the powder to the media surface under an air pressure within an air pressure curtain, thus making the application less susceptible to external environmental conditions. As such, the general purpose of the present invention, which will be described subsequently in greater detail, is to provide a new apparatus for use in dispensing powder to a media surface which has all of the advantages of the prior art and none of the disadvantages.

The invention is defined by the appended claims with the specific embodiment shown in the attached drawings. For the purpose of summarizing the invention, the new apparatus for dispensing powder to a media surface comprises a new and improved apparatus primarily developed for use in dispensing powder to a media surface comprising a mounting means, said mounting means comprising two complimentary pairs of mounting blocks with each of said complimentary pairs of mounting blocks providing means for securely attaching with one another and providing for attachment to a press. Said complimentary pairs of mounting blocks being die cast or otherwise configured to support and securely hold in place a hopper tube, a porous hopper feed roller, a vortex chamber, a plurality of two primary air manifolds, and a plurality of two air bars. In a second preferred embodiment, said complimentary pairs of mounting blocks are die cast or otherwise configured to support and securely hold in place a hopper tube, a porous hopper feed roller, a vortex chamber, a plurality of two primary air manifolds, a plurality of two secondary air manifolds, a plurality of two air bars, and a hopper.

The hopper tube is secured and supported by the mounting means. The hopper tube has a longitudinal opening on the upper portion thereof, said longitudinal opening providing access into the interior of the hopper tube. The hopper tube further has a lid which complements and covers the longitudinal opening. In a first embodiment, the hopper tube is the hopper for the powdered particulate material. The hopper tube contains the porous hopper feed roller in rotatable manner, said porous hopper feed roller being located within and extending longitudinally the interior length of the hopper tube such that a lower portion of the porous hopper feed roller extends into and rotates within a longitudinal opening on a lower portion of the hopper tube and a longitudinal opening on an upper portion of the vortex chamber. The hopper tube has two end plates, which end plates each complement, attach to and seal a respective open end of the hopper tube. The end plates further secure the hopper tube to the mounting means. The end plates each have a hole therethrough, said holes extending from the outside environment to the inside environment of the hopper tube. The holes provide for the sealed placement therein and support of two ends of a shaft extending longitudinally the length of the porous hopper feed roller such that the two ends rotate freely within the holes. The holes each further supports a bushing, one each of which bushings respectively supports one each of the two ends and positions the two ends rotatably within and between the end plates. The two ends each support one each of a plurality of two spacers, which spacers position the porous hopper feed roller between the end plates within the hopper tube.

The porous hopper feed roller controls the quantity of powdered particulate material being discharged into the vortex chamber by the rotational speed of the porous hopper feed roller within the hopper tube. In a first preferred embodiment, the surface of the porous hopper feed roller is granular. In a second preferred embodiment, the surface of the porous hopper feed roller is spiral grained.

A variable speed motor is provided. In a first preferred embodiment, the variable speed motor attaches to one of the end shafts of the porous hopper feed roller and provides for ½ to 25 RPM rotational speed of the porous hopper feed roller within the hopper tube. In a second preferred embodiment, the variable speed motor is offset from one of the end shafts and drives the same by means of a belt or a chain or other connecting apparatus. The variable speed motor is capable of being manually controlled by manual controller or automatically controlled by means of a Programmable Logic Controller (PLC). The manual controller comprises an AC to DC converter and a voltage divider on the output which drives the variable speed motor. By manually varying the voltage to said variable speed motor, the RPM of said porous hopper feed roller can be regulated and adjusted. For automatic control, by varying the out-put voltage from the PLC to the variable speed motor, the RPM of the porous hopper feed roller can be regulated and adjusted.

The vortex chamber is tubular in shape, attaches to, opens into, and extends along an upper portion thereof the longitudinal length of the lower portion of the hopper tube. The vortex chamber is secured by the mounting means. The vortex chamber has a longitudinal opening on the upper portion thereof to accommodate the longitudinal opening on the lower portion of the hopper tube within which longitudinal opening rotates the porous hopper feed roller. Thus, by means of the rotation of the porous hopper feed roller, the vortex chamber receives the desired quantity of powdered particulate material from the hopper tube into the vortex chamber.

The vortex chamber has an air pressure receipt means by which air pressure is angularly received within the vortex chamber, thus creating a vortex of rotating air within said vortex chamber. In a first preferred embodiment, the air pressure receipt means is plurality of two longitudinal angled slots through the opposite side walls of the vortex chamber, which plurality of two longitudinal angled slots provide air pressure and air flow at an angle into the vortex chamber, thus creating a vortex of rotating air in the vortex chamber. The vortex of rotating air within the vortex chamber receives the powdered particulate material from the hopper tube by the rotation of the porous hopper feed roller and suspends the powdered particulate material within the vortex of rotating air within the vortex chamber. In a preferred second embodiment, the air pressure receipt means is a plurality of two parallel longitudinal angled slots (four slots) through the opposite side walls of the vortex chamber, which plurality of two parallel longitudinal angled slots provide air pressure and air flow at an angle into the vortex chamber, thus creating a vortex of rotating air in the vortex chamber. In still a third preferred embodiment, the air pressure receipt means is a series angled air tubes, which series of angled air tubes provide air pressure and air flow at an angle into the vortex chamber, thus creating a vortex of rotating air in the vortex chamber.

The vortex chamber has an air pressure discharge means on a bottom portion thereof, which air pressure discharge means provides for the discharge of the suspended powdered particulate material from the vortex chamber and thus transport the powdered particulate material suspended in the vortex of rotating air from the vortex chamber to the media surface under pressure and provide for better powder displacement. In a first preferred embodiment, the air pressure discharge means is a longitudinal slot extending the length of the lower portion of the vortex chamber, which longitudinal slot has a relatively narrow opening into the interior of the vortex chamber and a relatively larger opening to the outside of the vortex chamber, thus creating a venturi effect by which the suspended powdered particulate material is discharged from the inside of the vortex chamber. In a second preferred embodiment, the air pressure discharge means is a longitudinal slot of uniform width extending the length of the lower portion of the vortex chamber, which longitudinal slot has parallel extensions which extend perpendicular to the length of the lower portion of the vortex chamber and thus better direct the flow of the discharge of the suspended powdered particulate material from the inside of the vortex chamber onto the media surface, particularly if the media surface is some relative distance from the point of discharge.

A plurality of two primary air manifolds are provided. One each of the plurality of two primary air manifolds is attached to and transfers pressurized air into the vortex chamber by way of the vortex chamber air pressure receipt means. One each of the plurality of two primary air manifolds is attached to the lateral opposite sides of the vortex chamber and secured thereto by the mounting means. The plurality of two primary air manifolds each receive a measured amount of air pressure from an outside air pressure source (not shown). In a second preferred embodiment, a plurality of two secondary air manifolds are provided. The plurality of two secondary air manifolds each are located between the vortex chamber and one each of the plurality of two primary air manifolds. The plurality of two secondary air manifolds each receive a measured amount of air pressure from one each of the plurality of two primary air manifolds and further regulate and transfer the measured amount of air pressure into the vortex chamber. The plurality of two secondary air feeds are supported by the mounting means.

A cam-actuated air valve is provided, which cam-actuated air valve can be controlled manually or controlled automatically by means of a PLC. Manual control of the air pressure and flow into the vortex chamber is accomplished by use of ball air valves, and automatic control of the air pressure and flow into the vortex chamber is accomplished by use of a plunger type air valve. The cam-actuated air valve controls the air pressure from the outside source (not shown) to the plurality of two primary air feeds thus to the vortex chamber.

A plurality of two longitudinal air bars are provided. The plurality of two longitudinal air bars are one each located on each side of the lower portion of the mounting means such that the vortex chamber air discharge means discharges the suspended powdered particulate material from the inside of the vortex chamber onto the media between the plurality of two longitudinal air bars. Each of the plurality of two longitudinal air bars has a longitudinal slit the length of the lower portion of the longitudinal air bar such that air pressure inside each of the plurality of two longitudinal air bars is directed downward onto the media surface, parallel with and one on each side of the discharge of the suspended powdered particulate material from the inside of the vortex chamber. The plurality of two longitudinal air bars each receive pressurized air from an outside source (not shown). The air flow from the plurality of two longitudinal air bars provide an air curtain onto the media surface within which the discharge of the suspended powdered particulate material from the inside of the vortex chamber must contact the media surface.

In a second preferred embodiment, a powder supply hopper is provided, which powder supply hopper is adapted to contain a supply of powdered particulate material. The powder supply hopper defines a powdered particulate material holding station for the powdered particulate material which is to be transported from the new and improved apparatus. The powder supply hopper has generally two ends, a top portion, a bottom portion, two vertical sides, and two diagonal sides, which generally form an open bottom, box-shaped holding container, and which diagonal sides form a funnel from the top portion to the bottom portion. The bottom portion of the powder supply hopper resides vertically above and on the hopper tube upper longitudinal opening and attaches longitudinally thereto, thereby allowing the powdered particulate material to freely flow into the hopper tube. The powder supply hopper has a hinged cover on the top portion thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new apparatus primarily developed for use in dispensing powder to a media surface.

It is another object of the present invention to provide a new apparatus primarily developed for use in dispensing powder to a media surface which may be easily and efficiently manufactured and marketed.

It is a further object of the present invention to provide a new apparatus primarily developed for use in dispensing powder to a media surface which is of a durable and reliable construction.

An even further object of the present invention is to provide a new apparatus primarily developed for use in dispensing powder to a media surface which is susceptible of a low cost of manufacture with regard to both materials and labor, and which accordingly is then susceptible of low prices of sale to the consuming public, thereby making such apparatus primarily developed for use in dispensing powder to a media surface economically available to the buying public.

Still yet another object of the present invention is to provide a new apparatus primarily developed for use in dispensing powder to a media surface which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive means in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

IN THE DRAWINGS

The invention will be better understood and objects other than those set forth above will become apparent when consideration is given to the following detailed description thereof. Such description makes reference to the annexed drawings wherein.

Figure 6:
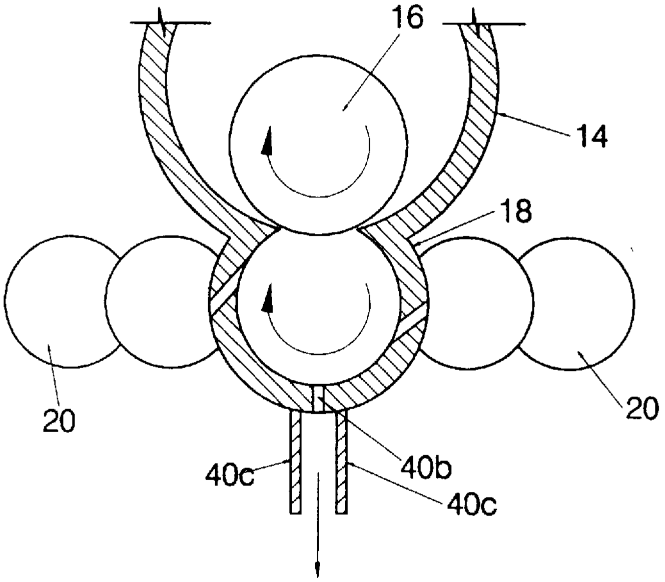

FIG. 6 is a perspective front end view of one embodiment of the new and improved powder dispensing apparatus of the present invention showing the air pressure discharge means with a longitudinal slot of uniform width extending the length of the lower portion of the vortex chamber, which longitudinal slot has parallel extensions which extend perpendicular to the length of the lower portion of the vortex chamber.

Figure 7:
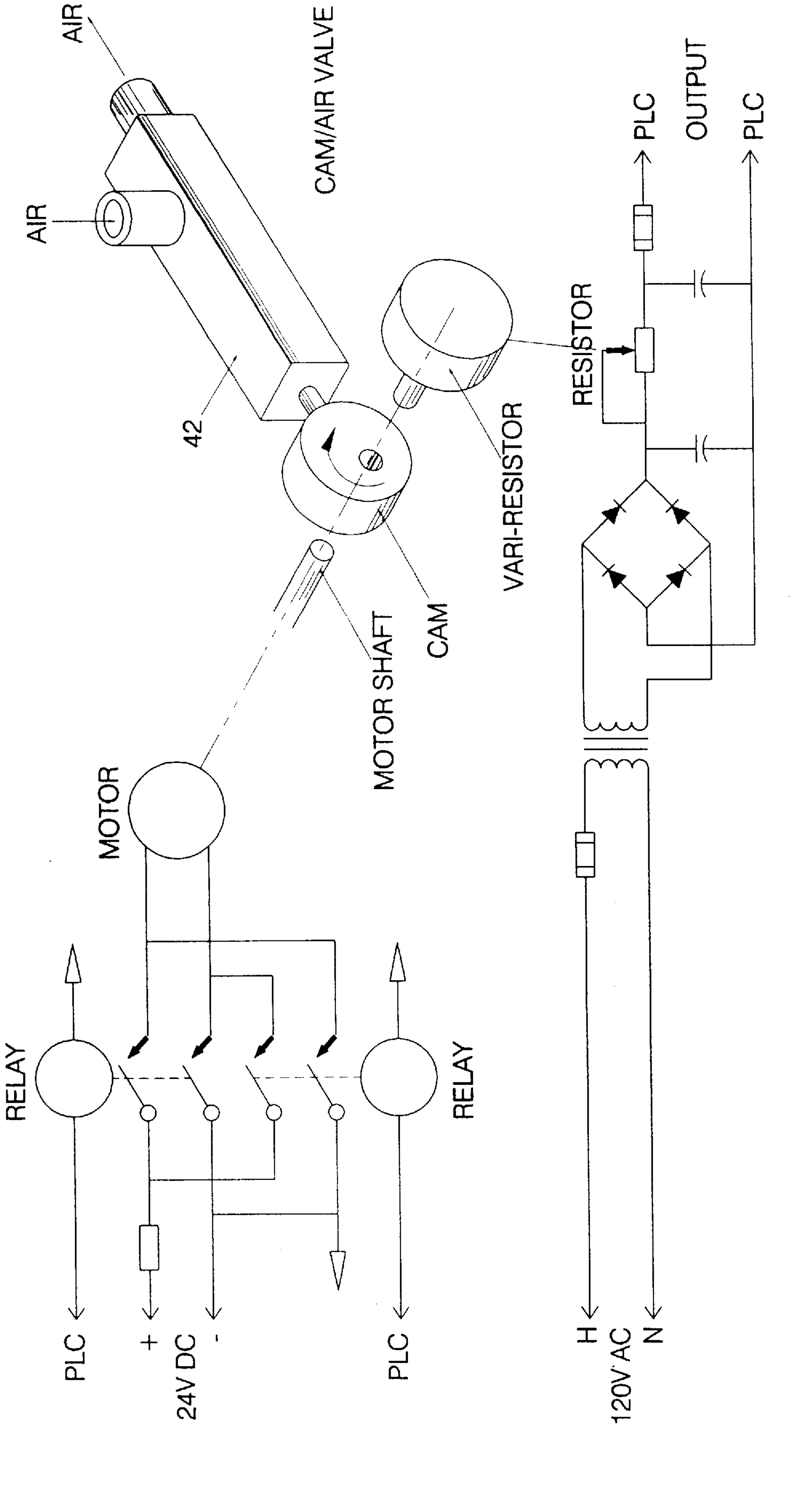

FIG. 7 is a schematic diagram illustrating the cam-actuated air valve.

Figure 8:
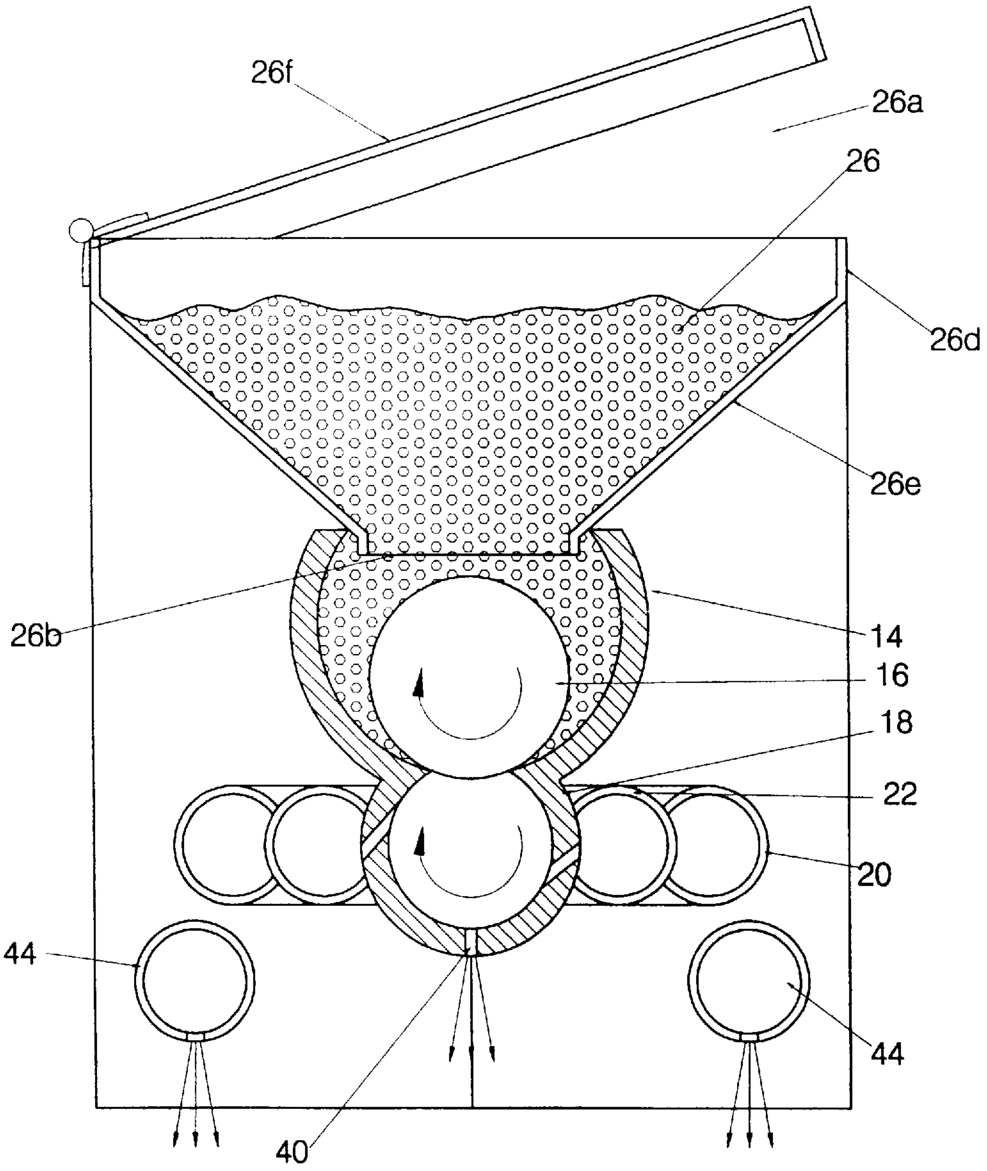

FIG. 8 is a perspective front end view of one embodiment of the new and improved powder dispensing apparatus of the present invention showing the discharge of powder onto a media surface.

DESCRIPTION OF THE PREFERRED EMBODIMENT

With reference now to the drawings, a new and improved powder dispensing apparatus 10 primarily developed for use in dispensing powder to a media surface embodying the principles and concepts of the present invention will be described.

Figure 1:
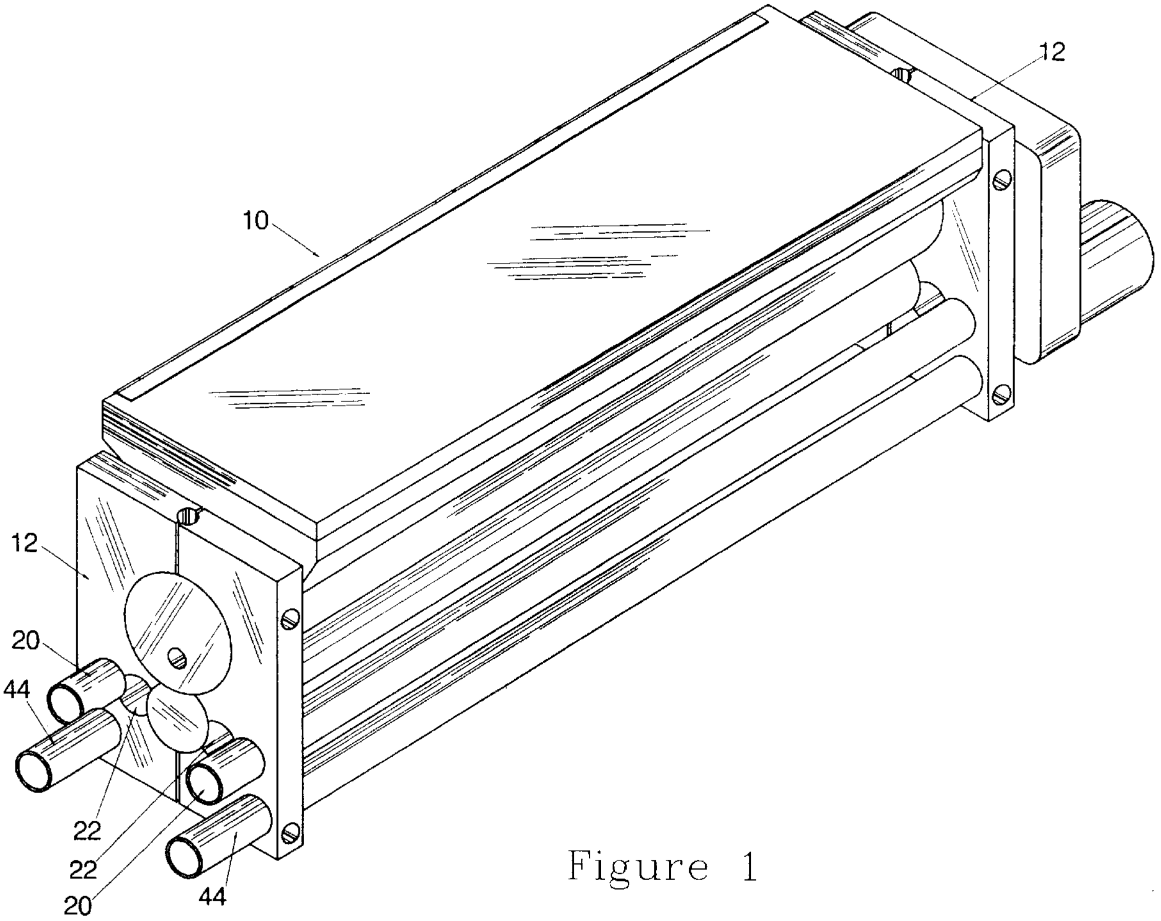
FIG. 1 is a view of the new and improved powder dispensing apparatus of the present invention.
Figure 2:
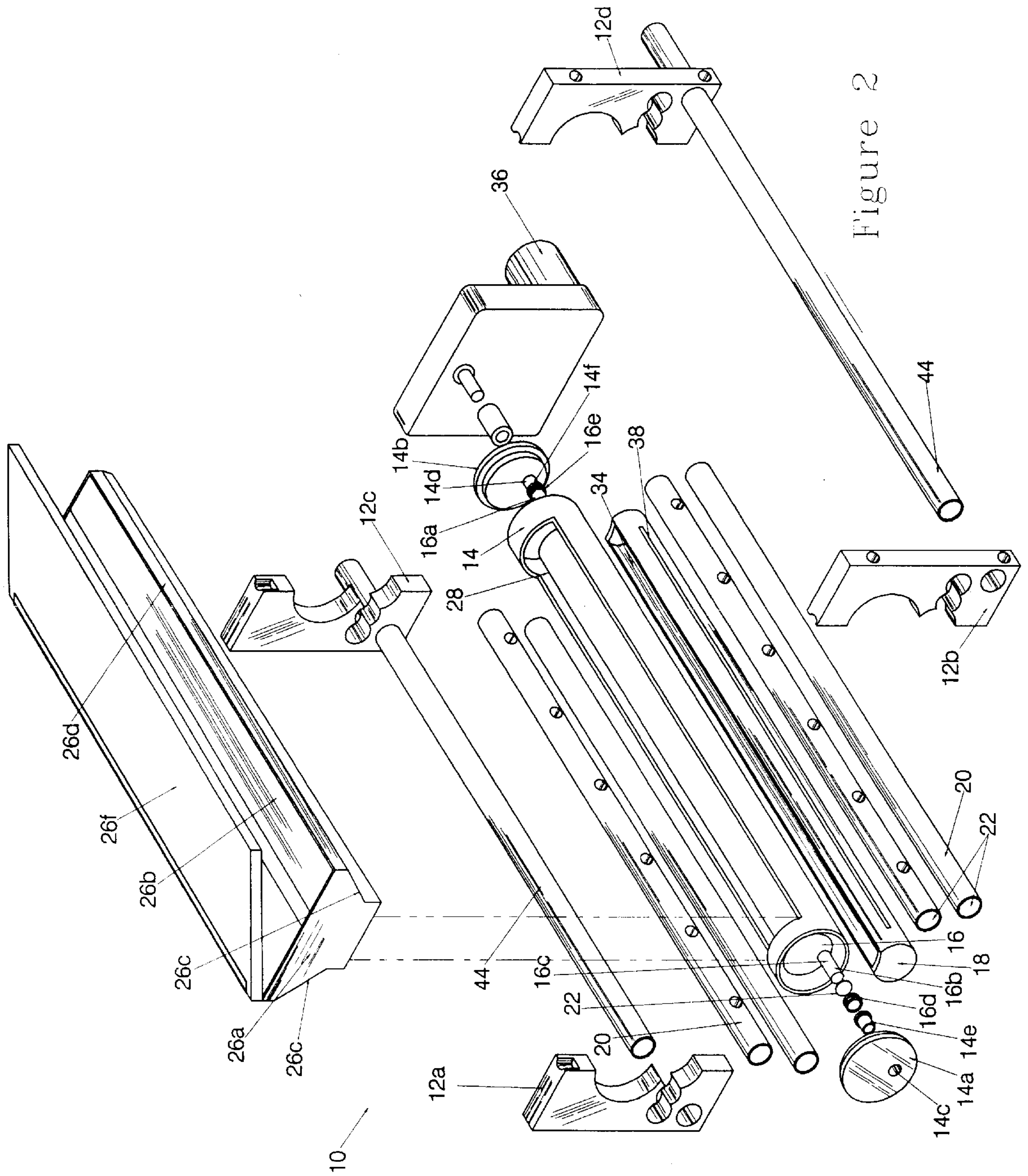
FIG. 2 is a perspective view of the new and improved powder dispensing apparatus of the present invention showing the elements thereof.
Figure 3:
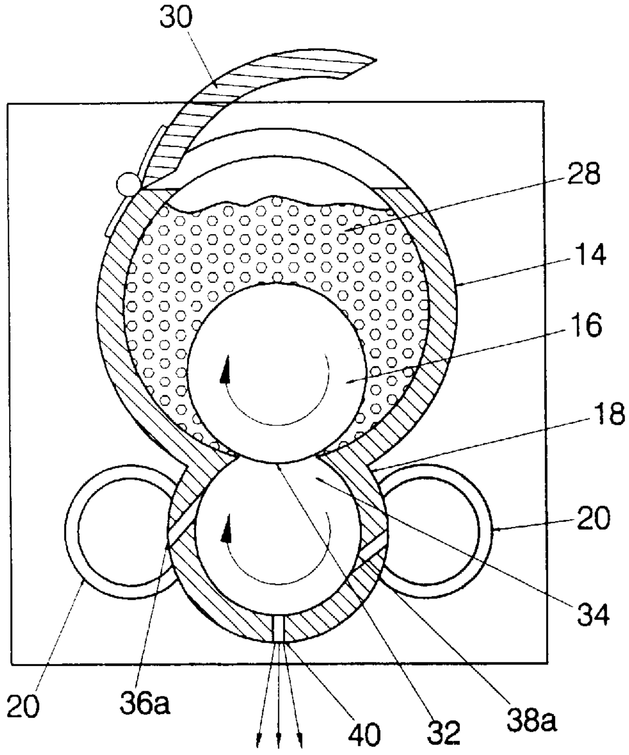
FIG. 3 is a perspective front end view of one embodiment of the new and improved powder dispensing apparatus of the present invention showing the hopper tube and lid thereon.
Figure 4:
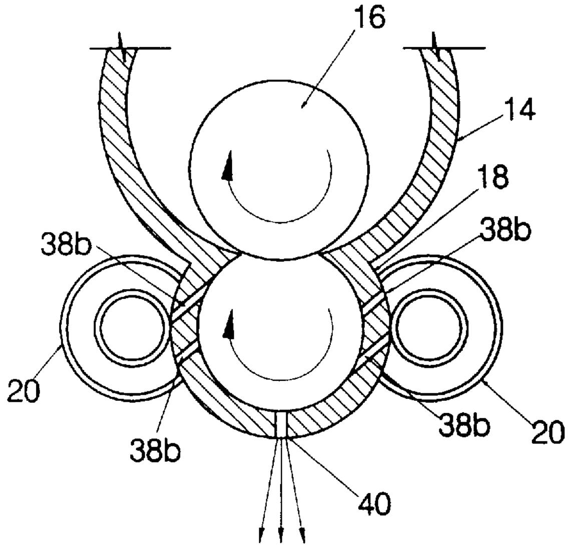
FIG. 4 is a perspective front end view of one embodiment of the new and improved powder dispensing apparatus of the present invention showing the plurality of two parallel longitudinal angled slots through the opposite side walls of the vortex chamber.
Figure 5:
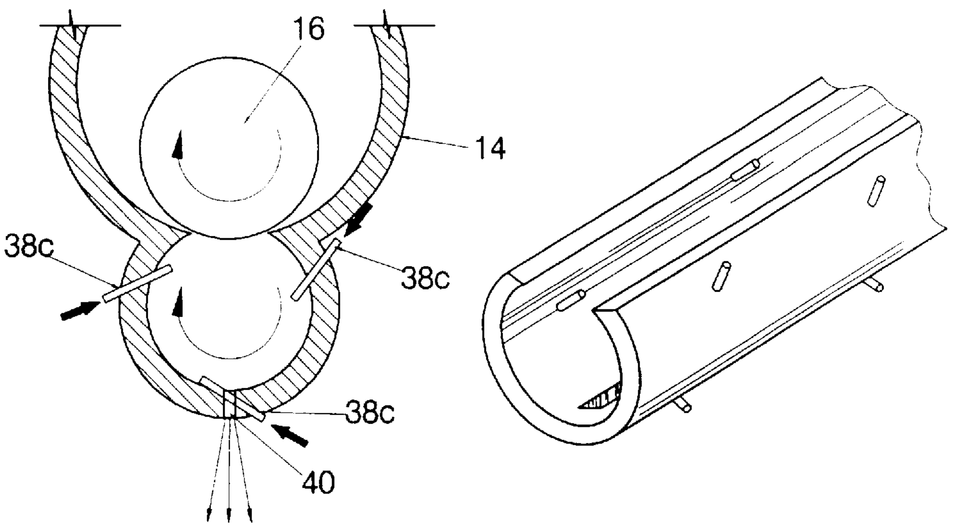
FIG. 5 is a perspective front end view of one embodiment of the new and improved powder dispensing apparatus of the present invention showing the series of angled air tubes into the vortex chamber.

From an overview standpoint, a first preferred embodiment of the new and improved powder dispensing apparatus 10 primarily developed for use in dispensing powder to a media surface is shown in FIG. 1.

The new and improved powder dispensing apparatus 10 includes a mounting means 12. Said mounting means 12 comprises two complimentary pairs of mounting blocks 12*a*, 12*b* and 12*c*, 12*d* with each of said complimentary pairs of mounting blocks 12*a*, 12*b* and 12*c*, 12*d* providing means for securely attaching with one another, 12*a* to 12*b* and 12*c* to 12*d*, and providing for attachment to a press (not shown) and thus press installation. Said complimentary pairs of mounting blocks 12*a*, 12*b* and 12*c*, 12*d* being die cast or otherwise configured to support and securely hold in place a hopper tube 14, a porous hopper feed roller 16, a vortex chamber 18, a plurality of two primary air manifolds 20, and a plurality of two air bars 44. In a second preferred embodiment, said complimentary pairs of mounting blocks 12*a*, 12*b* and 12*c*, 12*d* are die cast or otherwise configured to support and securely hold in place a hopper tube 14, a porous hopper feed roller 16, a vortex chamber 18, a plurality of two primary air manifolds 20, a plurality of two secondary air manifolds 22, a plurality of two air bars 44, and a hopper 26.

The hopper tube 14 is secured and supported by the mounting means 8. The hopper tube 14 has a longitudinal opening 28 on the upper portion thereof, said longitudinal opening 28 providing access into the interior of the hopper tube 14. The hopper tube 14 further has a lid 30 which complements and covers the longitudinal opening 28. In a first embodiment, the hopper tube 14 is the hopper 26 for the powdered particulate material. The hopper tube 14 contains the porous hopper feed roller 16 in rotatable manner, said porous hopper feed roller 16 being located within and extending longitudinally the interior length of the hopper tube 14 such that a lower portion of the porous hopper feed roller 16 extends into and rotates within a longitudinal opening 32 on a lower portion of the hopper tube 14 and a longitudinal opening 34 on an upper portion of the vortex chamber 18. The hopper tube 14 has two end plates 14*a*, 14*b*, which end plates 14*a*, 14*b* each complement, attach to and seal a respective open end of the hopper tube 14. The end plates 14*a*, 14*b* further secure the hopper tube to the mounting means 12. The end plates 14*a*, 14*b* each have a hole 14*c*, 14*d* therethrough, said holes 14*c*, 14*d* extending from the outside environment to the inside environment of the hopper tube 14. The holes 14*c*, 14*d* provide for the sealed placement therein and support of two ends 16*a*, 16*b* of a shaft 16*c* extending longitudinally the length of the porous hopper feed roller 16 such that the two ends 16*a*, 16*b* rotate freely within the holes 14*c*, 14*d*. The holes 14*c*, 14*d* each further supports a bushing 14*e*, 14*f*, one each of which bushings 14*e*, 14*f* respectively supports one each of the two ends 16*a*, 16*b* and positions the two ends 16*a*, 16*b* rotatably within and between the end plates 14*a*, 14*b*. The two ends 16*a*, 16*b* each support one each of a plurality of two spacers 16*d*, 16*e*, which spacers 16*d*, 16*e* position the porous hopper feed roller 16 between the end plates 14*a*, 14*b*, within the hopper tube 14.

The porous hopper feed roller 16 controls the quantity of powdered particulate material being discharged into the vortex chamber 18 by the rotational speed of the porous hopper feed roller 16 within the hopper tube 14. In a first preferred embodiment, the surface of the porous hopper feed roller 16 is granular. In a second preferred embodiment, the surface of the porous hopper feed roller 16 is spiral grained.

A variable speed motor 36 is provided. In a first preferred embodiment, the variable speed motor 36 attaches to one of the end shafts 16*a* of the porous hopper feed roller 16 and provides for ½ to 25 RPM rotational speed of the porous hopper feed roller 16 within the hopper tube 14. In a second preferred embodiment, the variable speed motor 36 is offset from one of the of the end shafts 16*a* and drives the same by means of a belt or a chain or other connecting apparatus. The variable speed motor 36 is capable of being manually controlled by manual controller or automatically controlled by means of a Programmable Logic Controller (PLC). The manual controller comprises an AC to DC converter and a voltage divider on the output which drives the variable speed motor 36. By manually varying the voltage to said variable speed motor 36, the RPM of said porous hopper feed roller 16 can be regulated and adjusted. For automatic control, by varying the out-put voltage from the PLC to the variable speed motor 36, the RPM of the porous hopper feed roller 16 can be regulated and adjusted.

The vortex chamber 18 is tubular in shape, attaches to, opens into, and extends along an upper portion thereof the longitudinal length of the lower portion of the hopper tube 14. The vortex chamber 18 is secured by the mounting means 8. The vortex chamber 18 has a longitudinal opening 34 on the upper portion thereof to accommodate the longitudinal opening 32 on the lower portion of the hopper tube 14 within which longitudinal opening 34 rotates the porous hopper feed roller 16. Thus, by means of the rotation of the porous hopper feed roller 16, the vortex chamber 18 receives the desired quantity of powdered particulate material from the hopper tube 14 into the vortex chamber 18.

The vortex chamber 18 has an air pressure receipt means 38 by which air pressure is angularly received within the vortex chamber 18, thus creating a vortex of rotating air within said vortex chamber 18. In a first preferred embodiment, the air pressure receipt means 38 is plurality of two longitudinal angled slots 38*a* through the opposite side walls of the vortex chamber 18, which plurality of two longitudinal angled slots 38*a* provide air pressure and air flow at an angle into the vortex chamber 18, thus creating a vortex of rotating air in the vortex chamber 18. The vortex of rotating air within the vortex chamber 18 receives the powdered particulate material from the hopper tube 14 by the rotation of the porous hopper feed roller 16 and suspends the powdered particulate material within the vortex of rotating air within the vortex chamber 18. In a preferred second embodiment, the air pressure receipt means 38 is a plurality of two parallel longitudinal angled slots 38*b* (four slots) through the opposite side walls of the vortex chamber 18, which plurality of two parallel longitudinal angled slots 38*b* provide air pressure and air flow at an angle into the vortex chamber 18, thus creating a vortex of rotating air in the vortex chamber 18. In still a third preferred embodiment, the air pressure receipt means 38 is a series angled air tubes 38*c*, which series of angled air tubes 38*c* provide air pressure and air flow at an angle into the vortex chamber 18, thus creating a vortex of rotating air in the vortex chamber 18.

The vortex chamber 18 has an air pressure discharge means 40 on a bottom portion thereof, which air pressure discharge means 40 provides for the discharge of the suspended powdered particulate material from the vortex chamber 18 and thus transport the powdered particulate material suspended in the vortex of rotating air from the vortex chamber 18 to the media surface under pressure and provide for better powder displacement. In a first preferred embodiment, the air pressure discharge means 40 is a longitudinal slot 40*a* extending the length of the lower portion of the vortex chamber 18, which longitudinal slot has a relatively narrow opening into the interior of the vortex chamber 18 and a relatively larger opening to the outside of the vortex chamber 18, thus creating a venturi effect by which the suspended powdered particulate material is discharged from the inside of the vortex chamber 18. In a second preferred embodiment, the air pressure discharge means 40 is a longitudinal slot 40*b* of uniform width extending the length of the lower portion of the vortex chamber 18, which longitudinal slot 40*b* has parallel extensions 40*c* which extend perpendicular to the length of the lower portion of the vortex chamber 18 and thus better direct the flow of the discharge of the suspended powdered particulate material from the inside of the vortex chamber 18 onto the media surface, particularly if the media surface is some relative distance from the point of discharge.

A plurality of two primary air manifolds 20 are provided. One each of the plurality of two primary air manifolds 20 is attached to and transfers pressurized air into the vortex chamber 18 by way of the vortex chamber 18 air pressure receipt means 38. One each of the plurality of two primary air manifolds 20 is attached to the lateral opposite sides of the vortex chamber 18 and secured thereto by the mounting means 12. The plurality of two primary air manifolds 20 each receive a measured amount of air pressure from an outside air pressure source (not shown). In a second preferred embodiment, a plurality of two secondary air manifolds 22 are provided. The plurality of two secondary air manifolds 22 each are located between the vortex chamber 18 and one each of the plurality of two primary air manifolds 20. The plurality of two secondary air manifolds 22 each receive a measured amount of air pressure from one each of the plurality of two primary air manifolds 20 and further regulate and transfer the measured amount of air pressure into the vortex chamber 18. The plurality of two secondary air feeds 22 are supported by the mounting means 12.

A cam-actuated air valve 42 is provided, which cam-actuated air valve 42 can be controlled manually or controlled automatically by means of a PLC. Manual control of the air pressure and flow into the vortex chamber 18 is accomplished by use of ball air valves, and automatic control of the air pressure and flow into the vortex chamber 18 is accomplished by use of a plunger type air valve. The cam-actuated air valve 42 controls the air pressure from the outside source (not shown) to the plurality of two primary air feeds 20 thus to the vortex chamber 18.

A plurality of two longitudinal air bars 44 are provided. The plurality of two longitudinal air bars 44 are one each located on each side of the lower portion of the mounting means 12 such that the vortex chamber 18 air discharge means 40 discharges the suspended powdered particulate material from the inside of the vortex chamber 18 onto the media between the plurality of two longitudinal air bars 44. Each of the plurality of two longitudinal air bars 44 has a longitudinal slit the length of the lower portion of the longitudinal air bar 44 such that air pressure inside each of the plurality of two longitudinal air bars 44 is directed downward onto the media surface, parallel with and one on each side of the discharge of the suspended powdered particulate material from the inside of the vortex chamber 18. The plurality of two longitudinal air bars 44 each receive pressurized air from an outside source (not shown). The air flow from the plurality of two longitudinal air bars 44 provide an air curtain onto the media surface within which the discharge of the suspended powdered particulate material from the inside of the vortex chamber 18 must contact the media surface.

In a second preferred embodiment, a powder supply hopper 26 is provided, which powder supply hopper 26 is adapted to contain a supply of powdered particulate material. The powder supply hopper 26 defines a powdered particulate material holding station for the powdered particulate material which is to be transported from the new and improved apparatus 10. The powder supply hopper has generally two ends 26*a*, a top portion 26*b*, a bottom portion 26*c*, two vertical sides 26*d*, and two diagonal sides 26*e*, which generally form an open bottom, box-shaped holding container, and which diagonal sides 26*e* form a funnel from the top portion 26*b* to the bottom portion 26*c*. The bottom portion 26*c* of the powder supply hopper 26 resides vertically above and on the hopper tube upper longitudinal opening 28 and attaches longitudinally thereto, thereby allowing the powdered particulate material to freely flow into the hopper tube 14. The powder supply hopper 26 has a hinged cover 26*f* on the top portion 26*b* thereof.

In operation, either the hopper tube 14 or the powder supply hopper 26 is filled with the desired quantity of powdered particulate material. The variable speed motor 36 is activated as well as the cam-actuated air valve 42. The variable speed motor 36 rotates the porous hopper feeder roller 16 within the hopper tube 14 at the desired RPM resulting in the desired quantity of powdered particulate material entering into the vortex chamber 18 and being suspended in the vortex of rotating air in the vortex chamber 18. The powdered particulate material suspended in the vortex of rotating air within the vortex chamber 18 is then dispensed through the vortex chamber air discharge means 40 on the bottom portion of the vortex chamber 18 onto the media surface under pressure and thus provides for better powder displacement.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While particular embodiments of the invention have been shown and described, it will be understood that the invention is not limited thereto, since modifications may be made that will become apparent to those skilled in the art.

What is claimed is:

1. A new powder dispensing apparatus for use with a press, comprising:

a mounting means for attachment to said press;

a hopper tube, said hopper tube being secured and supported by said mounting means;

said hopper tube having a longitudinal opening on an upper portion and a longitudinal opening on a lower portion, said longitudinal openings providing access into the interior of said hopper tube;

said hopper tube having a lid, said lid complementing and covering said longitudinal opening on said upper portion of said hopper tube;

a porous hopper feed roller, said porous hopper feed roller having a shaft therethrough and being located within, extending and rotating longitudinally an interior length of said hopper tube such that a lower portion of said porous hopper feed roller extends into and rotates within said longitudinal opening on said lower portion of said hopper tube;

said hopper tube having two end plates, said end plates each complementing, attaching to and sealing a respective open end of said hopper tube;

said end plates further securing said hopper tube to said mounting means;

said end plates each having a hole therethrough, said holes extending from the outside environment to the inside environment of said hopper tube and providing for the sealed placement therein and support of two ends of said shaft of said porous hopper feed roller, and further providing for said shaft rotating freely within said holes;

said holes each further supporting a bushing, said bushings each respectively supporting one each of said two ends of said shaft, and thus positioning said two ends rotatably within and between said end plates;

said two ends of said shaft each supporting one each of a plurality of two spacers, said spacers positioning said porous hopper feed roller between said end plates within said hopper tube;

a variable speed motor, said variable speed motor attaching to one of said ends of said shaft of said porous hopper feed roller;

said variable speed motor providing for ½ to 25 RPM rotational speed of said porous hopper feed roller within said hopper tube;

a vortex chamber, said vortex chamber being tubular in shape, attaching to, opening into, and extending along an upper portion thereof the longitudinal length of said lower portion of said hopper tube;

said vortex chamber being secured by said mounting means;

said vortex chamber having a longitudinal opening on an upper portion thereof to accommodate said longitudinal opening on said lower portion of said hopper tube;

said longitudinal opening providing for rotation therein of said porous hopper feed roller;

said vortex chamber having an air pressure receipt means, said air pressure receipt means providing for air pressure being angularly received within said vortex chamber;

said air pressure receipt means being plurality of two longitudinal angled slots through the opposite side walls of said vortex chamber;

said vortex chamber having an air pressure discharge means, said air discharge means being on a bottom portion thereof;

said air pressure discharge means being a longitudinal slot extending the length of said lower portion of said vortex chamber, said longitudinal slot having a narrow opening into the interior of said vortex chamber and a larger opening to the outside of said vortex chamber thus creating a venturi effect by which suspended powdered particulate material is discharged from the inside of said vortex chamber;

a plurality of two primary air manifolds, said plurality of two primary air manifolds being one each attached to and transferring pressurized air into said vortex chamber by way of said vortex chamber air pressure receipt means;

said plurality of two primary air manifolds being one each attached to lateral opposite sides of said vortex chamber and secured thereto by said mounting means;

a cam-actuated air valve, said cam-actuated air valve providing for regulated air pressure from an outside source;

a plurality of two longitudinal air bars, said plurality of two longitudinal air bars being one each located on each side of the lower portion of said mounting means between said vortex chamber air discharge means;

said plurality of two longitudinal air bars each having a longitudinal slit the length of a lower portion of said longitudinal air bar such that air pressure inside each of said plurality of two longitudinal air bars is directed downward onto a media surface, parallel with and one on each side of the discharge of the suspended powdered particulate material from said vortex chamber, thus providing a curtain within which a discharge of suspended powdered particulate material from said vortex chamber must contact a media surface; and, said plurality of two longitudinal air bars each receiving pressurized air from an outside source.

2. The apparatus of claim 1 wherein said mounting means further comprises a pair of complimentary mounting blocks, said pair of complimentary mounting blocks each providing means for securely attaching with one another and providing for attachment to a press, said pair of complimentary mounting blocks being die cast or otherwise configured for supporting and securely holding in place said hopper tube, said porous hopper feed roller, said vortex chamber, said plurality of two primary air manifolds, and said plurality of two air bars.

3. The apparatus of claim 2 further comprising a powder supply hopper, said powder supply hopper being adapted to contain a supply of powdered particulate material and having generally two ends, a top portion, a bottom portion, two vertical sides, and two diagonal sides generally forming an open bottom, box-shaped holding container:

said diagonal sides forming a funnel from said top portion to said bottom portion;

said bottom portion residing vertically above and on said hopper tube upper longitudinal opening; and said powder supply hopper having a hinged cover on said top portion.

4. The apparatus of claim 2 wherein said porous hopper feed roller has a granular surface.

5. The apparatus of claim 2 wherein said porous hopper feed roller has a spiral grained surface.

6. The apparatus of claim 2 wherein said variable speed motor is offset from one of said ends of said shaft and is connected thereto by means of a belt, a chain or other connecting apparatus.

7. The apparatus of claim 2 wherein said variable speed motor is capable of being manually controlled by a manual controller, said manual controller comprising an AC to DC converter and a voltage divider on the output which drive said variable speed motor by varying the voltage to said variable speed motor.

8. The apparatus of claim 2 wherein said variable speed motor is capable of being automatically controlled by a Programmable Logic Controller (PLC), said PLC providing for varying the out-put voltage from the PLC to said variable speed motor.

9. The apparatus of claim 2 wherein said cam-actuated air valve is capable of being manually controlled, said manual control being accomplished by use of ball air valves.

10. The apparatus of claim 2 wherein said cam-actuated air valve is capable of being automatically controlled, said automatic control being accomplished by means of a PLC and by using a plunger type air valve.

11. The apparatus of claim 2 wherein said air pressure receipt means further comprises a plurality of two parallel longitudinal angled slots, said plurality of two parallel longitudinal angled slots being through opposite side walls of said vortex chamber, said plurality of two parallel longitudinal angled slots providing air pressure and air flow at an angle into said vortex chamber.

12. The apparatus of claim 2 wherein said air pressure receipt means further comprises a series angled air tubes, said series of angled air tubes providing air pressure and air flow at an angle into said vortex chamber.

13. The apparatus of claim 2 wherein said air pressure discharge means further comprises a longitudinal slot of uniform width extending the length of the lower portion of said vortex chamber, said longitudinal slot having parallel extensions which extend perpendicular to the length of said lower portion of said vortex chamber.

14. A new powder dispensing apparatus for use with a press, comprising:

a mounting means for attachment to said press;

a hopper tube, said hopper tube being secured and supported by said mounting means;

said hopper tube having a longitudinal opening on an upper portion and a longitudinal opening on a lower portion, said longitudinal openings providing access into the interior of said hopper tube;

said hopper tube having a lid, said lid complementing and covering said longitudinal opening on said upper portion of said hopper tube;

a porous hopper feed roller, said porous hopper feed roller having a shaft therethrough and being located within, extending and rotating longitudinally an interior length of said hopper tube such that a lower portion of said porous hopper feed roller extends into and rotates within said longitudinal opening on said lower portion of said hopper tube;

said hopper tube having two end plates, said end plates each complementing, attaching to and sealing a respective open end of said hopper tube;

said end plates further securing said hopper tube to said mounting means;

said end plates each having a hole therethrough, said holes extending from the outside environment to the inside environment of said hopper tube and providing for the sealed placement therein and support of two ends of said shaft of said porous hopper feed roller, and further providing for said shaft rotating freely within said holes;

said holes each further supporting a bushing, said bushings each respectively supporting one each of said two ends of said shaft, and thus positioning said two ends rotatably within and between said end plates;

said two ends of said shaft each supporting one each of a plurality of two spacers, said spacers positioning said porous hopper feed roller between said end plates within said hopper tube;

a variable speed motor, said variable speed motor attaching to one of said ends of said shaft of said porous hopper feed roller;

said variable speed motor providing for ½ to 25 RPM rotational speed of said porous hopper feed roller within said hopper tube;

a vortex chamber, said vortex chamber being tubular in shape, attaching to, opening into, and extending along an upper portion thereof the longitudinal length of said lower portion of said hopper tube;

said vortex chamber being secured by said mounting means;

said vortex chamber having a longitudinal opening on an upper portion thereof to accommodate said longitudinal opening on said lower portion of said hopper tube;

said longitudinal opening providing for rotation therein of said porous hopper feed roller;

said vortex chamber having an air pressure receipt means, said air pressure receipt means providing for air pressure being angularly received within said vortex chamber;

said air pressure receipt means being plurality of two longitudinal angled slots through the opposite side walls of said vortex chamber;

said vortex chamber having an air pressure discharge means, said air discharge means being on a bottom portion thereof;

said air pressure discharge means being a longitudinal slot extending the length of said lower portion of said vortex chamber, said longitudinal slot having a narrow opening into the interior of said vortex chamber and a larger opening to the outside of said vortex chamber thus creating a venturi effect by which suspended powdered particulate material is discharged from the inside of said vortex chamber;

a plurality of two primary air manifolds, one each of said plurality of two primary air manifolds being attached to and transferring pressurized air into said vortex chamber by way of said vortex chamber air pressure receipt means;

said plurality of two primary air manifolds being one each attached to lateral opposite sides of said vortex chamber and secured thereto by said mounting means;

a plurality of two secondary air manifolds, said plurality of two secondary air manifolds being one each located between said vortex chamber and one each of said plurality of two primary air manifolds;

said plurality of two secondary air manifolds each receiving a measured amount of air pressure from one each of said plurality of two primary air manifolds and further regulating and transferring the measured amount of air pressure into said vortex chamber;

said plurality of two secondary air feeds being supported by said mounting means;

a cam-actuated air valve, said cam-actuated air valve providing for regulated air pressure to said new powder dispensing apparatus from an outside source;

a plurality of two longitudinal air bars, said plurality of two longitudinal air bars being one each located on each side of the lower portion of said mounting means between said vortex chamber air discharge means;

said plurality of two longitudinal air bars each having a longitudinal slit the length of a lower portion of said longitudinal air bar such that air pressure inside each of said plurality of two longitudinal air bars is directed downward onto a media surface, parallel with and one on each side of the discharge of the suspended powdered particulate material from said vortex chamber, thus providing a curtain within which a discharge of suspended powdered particulate material from said vortex chamber must contact a media surface; and, said plurality of two longitudinal air bars each receiving pressurized air from an outside source.

15. The apparatus of claim 14 wherein said mounting means further comprises a pair of complimentary mounting blocks, said pair of complimentary mounting blocks each providing means for securely attaching with one another and providing for attachment to a press, said pair of complimentary mounting blocks being die cast or otherwise configured for supporting and securely holding in place said hopper tube, said porous hopper feed roller, said vortex chamber, said plurality of two primary air manifolds, said plurality of two secondary air manifolds, and said plurality of two air bars.

16. The apparatus of claim 15 further comprising a powder supply hopper, said powder supply hopper being adapted to contain a supply of powdered particulate material and having generally two ends, a top portion, a bottom portion, two vertical sides, and two diagonal sides generally forming an open bottom, box-shaped holding container:

said diagonal sides forming a funnel from said top portion to said bottom portion;

said bottom portion residing vertically above and on said hopper tube upper longitudinal opening; and said powder supply hopper having a hinged cover on said top portion.

17. The apparatus of claim 15 wherein said porous hopper feed roller has a granular surface.

18. The apparatus of claim 15 wherein said porous hopper feed roller has a spiral grained surface.

19. The apparatus of claim 15 wherein said variable speed motor is offset from one of said ends of said shaft and is connected thereto by means of a belt, a chain or other connecting apparatus.

20. The apparatus of claim 15 wherein said variable speed motor is capable of being manually controlled by a manual controller, said manual controller comprising an AC to DC converter and a voltage divider on the output which drive said variable speed motor by varying the voltage to said variable speed motor.

21. The apparatus of claim 15 wherein said variable speed motor is capable of being automatically controlled by a Programmable Logic Controller (PLC), said PLC providing for varying the out-put voltage from the PLC to said variable speed motor.

22. The apparatus of claim 15 wherein said cam-actuated air valve is capable of being manually controlled, said manual control being accomplished by use of ball air valves.

23. The apparatus of claim 15 wherein said cam-actuated air valve is capable of being automatically controlled, said automatic control being accomplished by means of a PLC and by using a plunger type air valve.

24. The apparatus of claim 15 wherein said air pressure receipt means further comprises a plurality of two parallel longitudinal angled slots, said plurality of two parallel longitudinal angled slots being through opposite side walls of said vortex chamber, said plurality of two parallel longitudinal angled slots providing air pressure and air flow at an angle into said vortex chamber.

25. The apparatus of claim 15 wherein said air pressure receipt means further comprises a series angled air tubes, said series of angled air tubes providing air pressure and air flow at an angle into said vortex chamber.

26. The apparatus of claim 15 wherein said air pressure discharge means further comprises a longitudinal slot of uniform width extending the length of the lower portion of said vortex chamber, said longitudinal slot having parallel extensions which extend perpendicular to the length of said lower portion of said vortex chamber.

* * * * *